United States Patent
Boncodin

(10) Patent No.: US 8,191,663 B2
(45) Date of Patent: Jun. 5, 2012

(54) RADIOISOTOPE POWERED ENGINELESS VEHICLE

(76) Inventor: Franz B. Boncodin, Burlingame, CA (US)

( * ) Notice: Subject to any disclaimer, the term of this patent is extended or adjusted under 35 U.S.C. 154(b) by 1214 days.

(21) Appl. No.: 11/999,837

(22) Filed: Dec. 7, 2007

(65) Prior Publication Data

US 2011/0233990 A1    Sep. 29, 2011

(51) Int. Cl.
*B60K 8/00* (2006.01)
*B60L 11/00* (2006.01)

(52) U.S. Cl. ............ 180/65.31; 180/242

(58) Field of Classification Search ........... 180/65.31, 180/242, 2.2, 2.1; 60/203.1; 301/6.1; 136/202
See application file for complete search history.

(56) References Cited

U.S. PATENT DOCUMENTS

| | | | | |
|---|---|---|---|---|
| 3,280,568 A * | 10/1966 | Friedman et al. | ............ | 60/203.1 |
| 3,353,354 A * | 11/1967 | Friedman et al. | ............ | 60/203.1 |
| 3,564,302 A * | 2/1971 | Levedahl et al. | ............ | 376/321 |
| 7,178,337 B2 * | 2/2007 | Pflanz | ............ | 60/641.2 |
| 7,273,981 B2 * | 9/2007 | Bell | ............ | 136/205 |
| 7,493,974 B1 * | 2/2009 | Boncodin | ............ | 180/2.2 |
| 8,035,274 B2 * | 10/2011 | Erbil et al. | ............ | 310/306 |
| 8,065,972 B2 * | 11/2011 | Howard et al. | ............ | 114/337 |
| 2004/0031514 A1 * | 2/2004 | Bell | ............ | 136/203 |

* cited by examiner

*Primary Examiner* — J. Allen Shriver, II
*Assistant Examiner* — Jacob Meyer

(57) ABSTRACT

A radioisotope powered thermoelectric vehicle lacking an internal combustion engine. The vehicle may include a commercially available, federally-approved encased radioisotope, sensors, an encased metal heat conductor, a heating element embedded within a heat sink, a plurality of thermoelectric chips mounted around the outer surface of the heat sink, a hollow body surrounding the heat sink with a space present between the heat sink and the hollow body, a power converter, an electric power regulation and distribution system, a magnetic reed relay unit, operational and directional controls, radioisotope thermoelectric power generator, and at least one DC motor mounted to a wheel of the vehicle. A portable lead-lined metal, climate-controlled, and airtight lockbox may house the entire power generating unit providing for more than redundant systems protection. The vehicle is capable of running indefinitely under all weather conditions, without "refueling" for decades and without introducing toxic emissions into the environment.

20 Claims, 10 Drawing Sheets

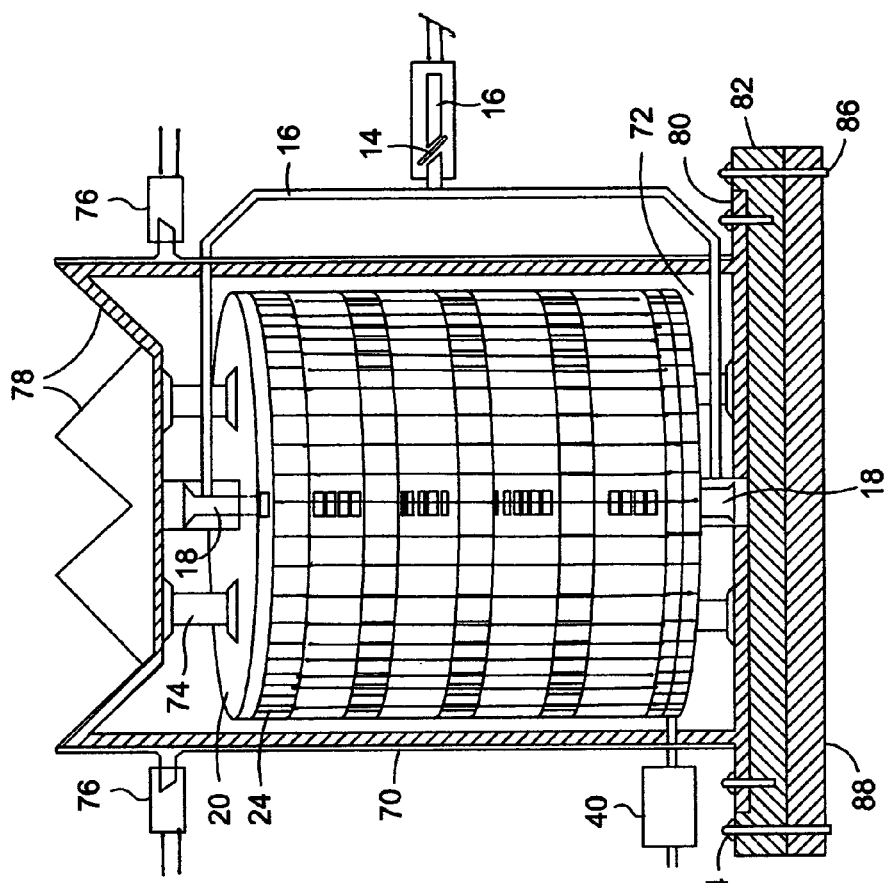
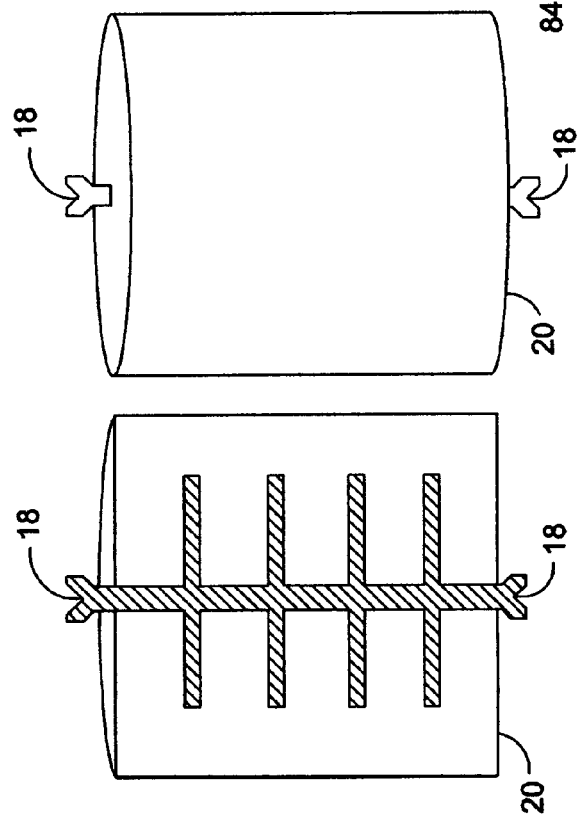
FIG. 6
FIG. 5

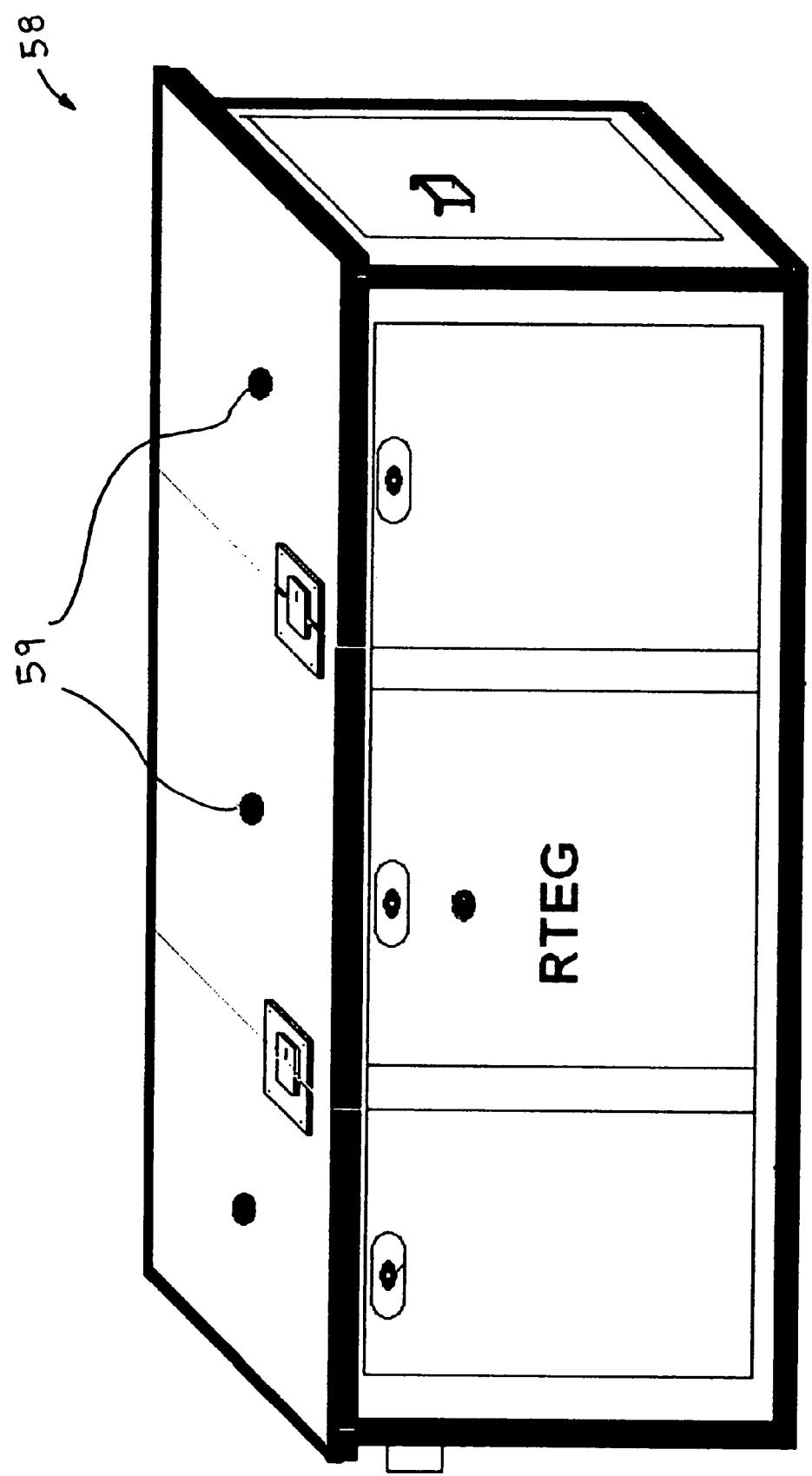
Fig. 10-A

RADIOISOTOPE POWERED ENGINELESS VEHICLE

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Field of the Invention

The present invention relates to vehicles that do not use combustion engines and therefore do not require diesel, gasoline, alcohol, ethanol, additives, other liquid gases or fuels, or sets of batteries to operate. In particular, the present invention relates to Radioisotope Thermoelectric Vehicles (RTEV). More particularly, the present invention relates to vehicles having a thermoelectric power generator power source heated by commercially available isotopes.

2. Background of the Invention

For many decades now it has been recognized that there is a definite, proven, and continuing degradation of Earth's environment caused at least partially by human activities. Most countries agree that the causes of such degradation or environmental pollution are attributable to, but not necessarily limited to: (1) combustion engines burning fossil fuels; (2) smoke stacks; (3) abuse and devastation of world forests, rivers, lakes, and oceans; (4) irresponsible solid and liquid disposal methods; (5) politics; (6) standards of living; and (7) the sheer number of people living on the planet exhaling a combined 24 billion kilograms of carbon dioxide every day.

For the purpose of this invention, "air pollution" is defined as the introduction of any form of substance, gas, or element other than pure air or oxygen into the atmosphere. One of the objects of the present invention is to address the first environmental pollution problem discussed above, i.e., the burning of fossil fuels by combustion engines. Various civilian, government, and military sectors have advanced solutions for reducing or slowing down air pollution caused by combustion engines that burn fossil fuels. Governments, the public, and car companies have all pushed for more efficient combustion engines, cleaner and cheaper diesel and gasoline fuels, alternative fuel sources, hybrid vehicles, and fully electric vehicles. All of these methods are well intentioned; however, factors such as cost, politics, corporate interests, economics, and special interest groups limit their applicability.

So far the entire world has been focused on reducing one of the major sources of air pollution, i.e., combustion engines burning fossil fuels and introducing toxic emissions into the atmosphere. The reduction of burnt fossil fuels, although an admirable goal, is only a partial solution to an acute problem. One goal of the present invention is eliminating air pollution caused by combustion engines. This approach is practical, thorough, and complete, without creating deadly chemical cycles and unexpected side-effects.

Another goal of the present invention is to realize a shift from an oil-based economy to a non-oil-based global community resulting in a new "smokeless" generation. This generation will be able to retire combustion engines and the use of fossil fuels to run them. A hope is that this change will encourage more harmonious geo-political relations among the countries of the world and would result in creating a level playing field in developing economies of the world.

The thermoelectric "Seebeck effect" was discovered by German-Estonian physicist Thomas Johann Seebeck in 1821. Unlike photovoltaic technology, which generates electricity through the use of solar cells, the Seebeck or thermoelectric effect is the direct conversion of thermal differentials to electric voltage. The reverse of the Seebeck effect is the "Peltier effect," which generates cooling. This reverse cooling/heating characteristic of thermoelectric technology is not found in the photovoltaic technology.

Since the discovery of the Seebeck effect, thermoelectric module design and construction has been mechanical, therefore having a minimal conversion efficiency. Although this mechanical construction has served industries well for more than a hundred years, it was not until some 25 years ago when innovations made by the semi-conductor industry allowed for the design and construction of conventional mechanical thermoelectric modules to chip-type design, materials, and construction. These innovations have improved the conversion efficiency, allowing for newer thermoelectric "chips," which need more efficiency enhancements.

For thermoelectric modules or chips to work, their "hot side" must be exposed to heat. Various heating materials (such as, "heat sinks") and configurations may be used. In the present invention, the heat sinks of choice are, but are not limited to, specially formulated carbon graphite cylindrical blocks, metals, tiles, stone, or like materials. The cylindrical shape is preferred because it affords efficient and uniform distribution of heat and cooling characteristics. The selected heat sink must be designed to be thermally conductive, but not electrically conductive, and should function as a "heating agent" only.

In order for the thermoelectric modules or chips to become hot so as to generate electricity, the heat sink must be made hot. Also, the heat sink must be able to easily absorb and retain heat for a long period of time. To make the heat sink hot, heat sources must be harnessed and/or conducted. The present invention utilizes radioisotopes as a heat source.

BRIEF SUMMARY

Having identified the thermoelectric chips, heat sink, and heat source, the manner, method, design, material, and construction of the heat delivery apparatus, system, or method will now be discussed.

The present thermoelectric vehicle invention would be equipped with at least one thermoelectric power generator and employ at least one motor/apparatus that generates/stores "extended heat," thereby supplying the thermoelectric generator with heat as a backup system. Depending on the conversion efficiency of the installed thermoelectric chips, one thermoelectric generator may be sufficient to power the vehicle, while the other thermoelectric generator is held in reserve, cold, but ready to be activated when needed.

Generally, radioisotope- or isotope-heated thermoelectric power generators require only one extended heat generator. The continuous heat generated and conducted to the heat sink by the isotope allows the Radioisotope Thermoelectric Generator (RTEG) to operate non-stop until the isotope is spent some several years later.

When an RTEV-powered vehicle is not operating or is parked, conduction of heat from the isotope to heat sink can be suspended using an on/off switch, thus allowing the thermoelectric power generator to remain cold, if so desired. When ready to drive, the heat conductor can easily be switched on and within minutes, the RTEV can be fully operational, day or night, in all weather conditions.

If a house or other building where an RTEV vehicle is parked is properly wired to accept power from an alternate source, the operator can simply switch off the main power line supplying the house or building and plug the house into the RTEV. This feature is the exact opposite of battery-powered electric cars; battery-powered cars are typically plugged into the house to draw electricity from the house to charge the batteries. In contrast, the RTEV allows the house to be plugged into the car, thereby providing power to the house, minimizing electricity bills and conserving offsite power provided by utility companies. This change in human daily conventional or habitual activity is thought to have a profound impact on how humans live, conserve natural resources, affect the earth's degradation, and conserve finances.

Conceivably, RTEV vehicles can be continuously driven 24 hours a day, in all weather conditions, for as long as the driver can safely continue driving. Although RTEV vehicles will have to follow all posted speed limits, it is believed that they could be operated at sustained speeds up to and above 120 miles per hour. As long as the heat sink remains hot, the thermoelectric chips will continue generating power to turn the DC motors mounted directly on the wheels of the vehicle, with power to spare for all auxiliary needs of the vehicle.

Since thermoelectric power generators are free-standing compact components including all peripheral parts that compose the vehicle power source, these components or parts can be housed in a sealed, climate-controlled lock box that can be taken in or out of the vehicle's front, center, or back compartments. In other words, one can mount or dismount the power generator lock box with ease, if desired. The vehicle may be sold with or without the power generator lock box and new vehicles may be brought to the market with or without the power generator lock box.

Having an air-tight, climate-controlled thermoelectric power generator lock box allows the vehicle to go amphibian or operate in harsh weather and terrain conditions, such as snow, ice, or desert conditions. "Specialty" models designed to operate in these conditions would be particularly well suited for government, military, police, homeland defense, fleet operators, the coast guard, or water sports applications. Military vehicles that do not need traditional fuels to operate will be especially useful in active combat situations or to maximize civilian mass movement without worrying about fuel costs or delivery issues.

Acquisition, ownership, registration, control, use, and maintenance of RTEV vehicles will likely require specific sets of rules and regulations due to the use of an isotope power source. An RTEV vehicle's power generator may be heated by the decaying action of commercially available isotopes presently used in various industries. Although there are concerns about the negative impact from using isotopes, it is believed that the educated, scientific, and proper use of isotopes far outweighs these negative results produced from the continued use of burning fossil fuels contributing to air pollution, global warming, acid rain, polluted water sources, and arable land. With the proper education, knowledge, training, and technology advances, it is believed that the dangers, risks, and other concerns caused by the use of commercially available isotopes in RTEV vehicles will be minimal.

By harnessing the power of heat derived from commercially available isotopes, the shift from oil based combustion engines to non-oil based power sources will greatly improve the world. By having a safe, independent, portable, sustainable, and cost effective power source available at any time, with which you can power one's own home, the net result will be a great reduction in power generation demand, less abuse of land, water, and air resources used in power generation, and would help in stopping world conflict over oil.

According to the present invention, a land vehicle with a power source derived from thermoelectric power generators heated by radioisotopes is provided. One embodiment is a land vehicle with a body shape similar to present day conventional vehicles, but lacking a combustion engine and all of the parts or components and fuels that go along with the operation of a combustion engine vehicle. This embodiment eliminates the need for the use of fossil fuels or alternative liquids or gasses to fuel the engine, instead the embodiment includes a Radioisotope Thermoelectric Power Generator (RTEPG) that derives heat from the decaying action of a commercially available isotope, wherein the heat is directed toward a metal rod embedded in the center of a cylindrical-shaped carbon graphite heat sink. The heat sink becomes hot when the heat is transferred to the cylindrical metal rod embedded within, and in contact with, the carbon heat sink.

The heated carbon heat sink may then transfer heat to the "hot side" of thermoelectric chips which are installed in series and securely wrapped around the cylindrical carbon heat sink. The heat activates the thermoelectric chips to generate electricity by the Seebeck effect. The electricity may then be directed into a converter, then to a power, electronics, and control system and optional auxiliary systems or apparatuses of the vehicle. When the vehicle is activated, for example by turning an ignition key in the vehicle and engaging a starting button, the vehicle is in a ready state able to function, accelerate, decelerate, and move forwards or backwards at the touch of a lever, gear, or switch within the driver's area, thereby activating direct current (DC) motors directly mounted to the wheels of the vehicle. The DC motors may be mounted to each wheel of the vehicle. Further, the vehicle may be directionally controlled by a steering wheel, and may be electrically and electronically managed by a motor controller/regenerative braking system thereby allowing the driver to operate the vehicle in a "normal" or conventional manner.

Another aspect of the invention allows the vehicle to operate in the absence of an active radioisotope. In this case, the vehicle's power source may be heated by plugging it into a conventional household or office outlet for a few minutes. Once hot, the vehicle becomes ready to operate with no practical distance limitation for as long as the heat sink is constantly heated from its own operation aided by motors that generate/store "extended heat" that is useful when an active radioisotope is not available to start the vehicle. Also, an emergency method of starting the vehicle includes heating the heat sink by touching the heat sink's metal rod with an externally heated metallic unit until the heat sink attains the desired temperature for the thermoelectric chip to activate and generate electricity. This method may be thought of as "jump heating" the vehicle in comparison to the "jump starting" of a typical combustion engine.

Other than the thermoelectric power generator and heat sink unit, an RTEV vehicle has electrical, mechanical, electronics control and management systems, and operational characteristics similar to electric cars powered solely by batteries, and the only sound produced by a running RTEV is a low decibel muffled "hissing" sound from its wheels and the sound of wind as it impacts with the vehicle during movement. At a full stop, the RTEV manifests no sound and the only indication that the vehicle is running may be the colored operating lights on the dash board, steering wheel, backseat, and on all four corners of the external vehicle body. As an option, a recording of a combustion engine may be played to simulate the sound of a conventional vehicle.

In another embodiment of the present invention, a thermoelectric power generator may independently power a typical residential home or other structure, including the electrical needs of a typical house or office for decades. Such thermoelectric power generators when further enhanced, may be employed for almost all uses where electricity is required. The ability to independently generate a portable, safe, cost effective, durable, and environmentally friendly power source will have immeasurable positive advantages. Other exemplary embodiments and advantages of the present invention may be ascertained by reviewing the present disclosure and accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 5 is a cross-sectional and side view of a carbon graphite thermoelectric power generator heat sink utilized in one embodiment of the present invention, including a metal rod that acts as a heating element embedded in the center and through the length of the heat sink;

FIG. 6 is a side view of a thermoelectric power generator of the present invention;

DETAILED DESCRIPTION

The detailed description set forth below is intended as a description of the presently preferred embodiment of the invention, and is not intended to represent the only form in which the present invention may be designed, constructed, or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Figure 1:
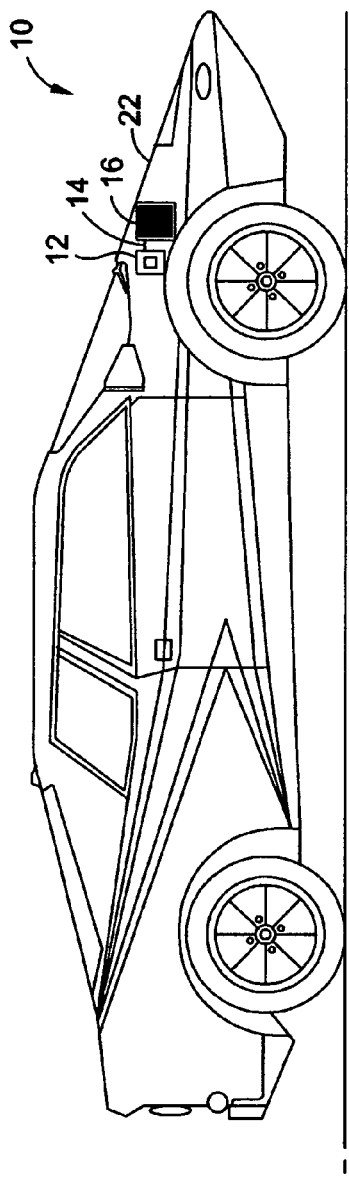
FIG. 1 is a side view of one embodiment of a radioisotope thermoelectric powered vehicle of the present invention indicating a possible location of the radioisotope heat source.

One embodiment of the present invention encompasses an engineless Radioisotope Thermoelectric Vehicle 10 (RTEV). As can be seen in FIG. 1, the external body of the vehicle 10 may be configured like an ordinary, present day combustion engine powered car. In this embodiment, an encased isotope element 12 produces heat which travels to an on/off heat conductor regulator 14 which permissively allows the flow of heat to a heat conductor 16 in thermal contact with a metal rod 18, or heating element, embedded in the center of and extending through the length of a carbon graphite heat sink 20. The transmitted heat thus heats the heat sink 20 and the hot side of thermoelectric chips 24, which are wrapped around the heat sink 20, thereby producing electricity for the vehicle to operate. Although shown mounted under the front hood 22 of the vehicle 10, the isotope element 12 could be located within any storage compartment of the vehicle including, but not limited to, in the trunk 38 of the vehicle 10.

Figure 3:
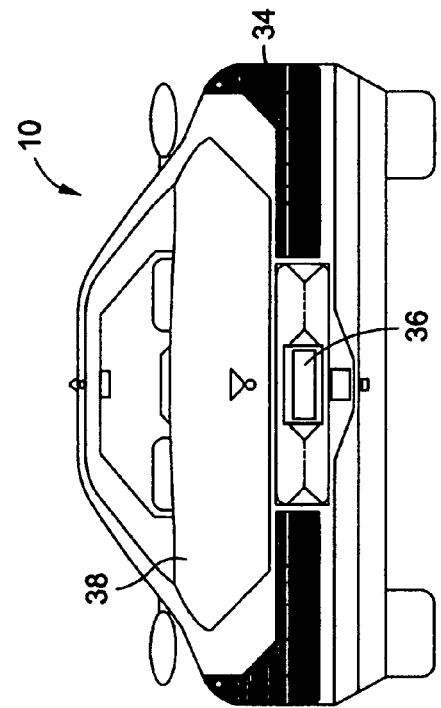
FIG. 3 is a rear view of the vehicle in FIG. 1 including the lack of an exhaust system.
Figure 2:
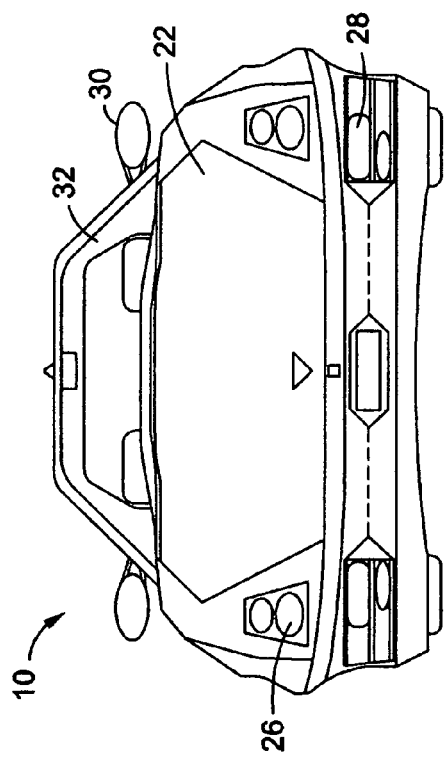
FIG. 2 is a front view of the vehicle in FIG. 1 including the lack of radiator grills.

FIG. 2 illustrates a front view of the vehicle 10, in which the vehicle 10 includes standard external features required of vehicle on the road today, for example, headlights 26, turn signals 28, side view mirrors 30, and a windshield 32. It is to be noted that the vehicle 10 does not require radiator grills as are typical in combustion engine vehicles. Similarly, FIG. 3 illustrates a rear view of the vehicle 10, in which the vehicle 10 features such standard vehicle features as tail lights 34, license plate holder 36, and trunk 38. Again, it is to be noted that the vehicle 10 lacks apparatuses required by combustion engine vehicles, such as exhaust tail pipes.

Figure 4:
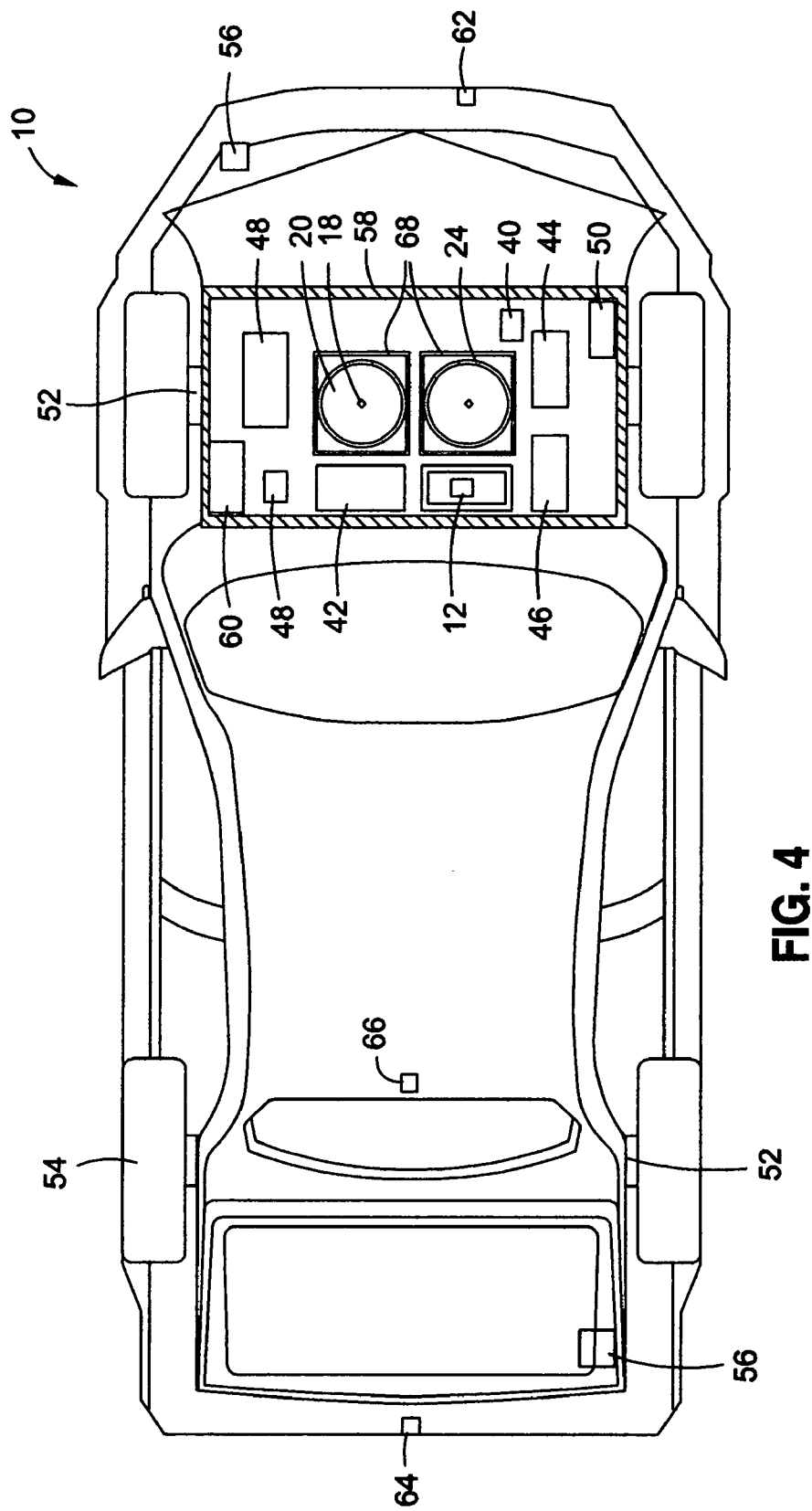
FIG. 4 is a top diagram view of the vehicle in FIG. 1 showing a secured lock box containing a radioisotope heat source, thermoelectric power generator, and other internal components.

FIG. 4 is a cutaway top view of the vehicle 10 illustrating the working relationships between and among the different components of the vehicle 10. For example, the vehicle 10 includes an encased isotope element 12 inside a lead-lined metal lock box 58 located in the front hood compartment 22 of the vehicle 10. The vehicle 10 may further include radiation sensors, detectors, audible, and/or visual alarms (not shown) to detect any early radiation leakage. The encased isotope element 12 produces heat which travels to an on/off heat conductor regulator 14 which permissively allows the flow of heat to a heat conductor 16 in thermal contact with vertical and horizontal metal rods 18 embedded in the center of a carbon graphite heat sink 20. The heat is evenly distributed to the entire body length of the cylindrical heat sink 20 thereby heating the hot side of the thermoelectric chips 24 securely wrapped around the full body of the heat sink 20, thus generating electricity. The generated electricity is first directed to a power converter 40 and then to an electronics management and control system 42 which distributes power to all operating components and accessories of the vehicle. Such components and accessories may include a regenerative braking system 44, a magnetic reed relay system 46, an extended heat generator 48, power storage 50, direct current (DC) motors 52 directly mounted to the wheels 54, front and/or rear retractable heating plugs 56, climate control 60, and all other power/electronics/switch needs of a thermoelectric powered vehicle 10. The extended heat generator 48 produces heat and augments heat to the heat sink 20, when necessary. Although the DC motors 52 may be mounted to any number of wheels 54, one embodiment includes DC motors 52 mounted to all wheels 54 of the vehicle 10. Further optional equipment may include a front warning sensor 62, rear warning sensor 64, and a rear view camera 66 mounted on the rear roof edge. To protect the thermoelectric power generator metal housing 68, the lock box 58 may be air-tight and/or climate controlled and may house the major internal components that comprise the thermoelectric system.

FIG. 5 illustrates both a cross sectional view and a side view of the cylindrical carbon graphite heat sink 20 of one embodiment of the present invention. The heat sink 20 is shown with vertical and horizontal embedded metal rods 18 that are operative to receive heat from the heat conductor 16 and uniformly distribute the heat throughout the entire length and body of the heat sink 20. Although described herein as being composed of carbon graphite, the heat sink 20 could be constructed from a variety of materials that are thermally but not electrically conductive, including, but not limited to, carbon materials, plastic materials, metal, stone, glass, or composite materials. The embedded metal rods 18 serve as heating elements and help maintain and conserve heat.

FIG. 6 illustrates the design of one embodiment of the present invention featuring a thermoelectric power generator heated by the isotope element 12. Heat from the element 12 is absorbed and conducted to a lead-lined heat conductor 16 via a heat conductor regulator 14 that regulates the flow of heat to the metal rod 18 extending above, through, and below the heat sink 20. The heat conductor 16 may be in thermal contact with both ends of the metal rod 18. The heat conductor regulator 14 may be turned on or off automatically or by the operator of the vehicle 10 to allow or not allow conduction of heat from the isotope element 12 to the heat sink 20. The metal rod 18 in turn conducts heat throughout the interior of the heat sink 20 to the surface or outer perimeter of the heat sink 20, which is covered by thermoelectric chips 24 installed with their hot sides positioned against the outer surface of the heat sink 20. The heat then begins heating the hot side of the thermoelectric chips 24, which upon reaching a particular temperature start generating electricity which is conducted through electrical wires to a power converter 40. The power converter 40 may convert the direct current (DC) to alternating current (AC) if necessary. The heat sink 20 is enclosed within a lead-lined cylindrically shaped thermoelectric power generator body 70. The power generator body 70 is hollow and intentionally sized so as to allow for the presence of a hollow space 72 between the thermoelectric chips 24 and the inner wall of the body 70. Without presenting an exhaustive list of materials, the power generator body 70 may be constructed from metal materials, carbon materials, acrylic or plastic materials, cement, tiles, water-lined canisters, wood, glass, stone, clay, or composite materials. The power generator body 70 may be constructed from steel lined with lead to double the United States regulation requirements for radioactive materials. Furthermore, any federally-approved materials, design, and construction may be employed.

The heat sink 20 is positioned and supported in place by at least four non-heat absorbing support assemblies 74. The support assemblies 74 are partly embedded into the top and bottom of the heat sink 20 and fasten the heat sink 20 unto the interior top and bottom walls of the thermoelectric power generator body 70. The temperature of the heat sink 20 while the vehicle is operational is much higher than the temperature inside the hollow space 72, which must be kept at ambient or near-ambient temperature. To regulate and maintain such temperature differential, the body 70 may include heat outlets 76 and/or cooling fins 78. The extra heat dissipated from the hollow space 72 through the heat outlets 76 may be directed to a heat storage unit (not shown) and later used to augment the heat sink heating requirement when necessary or to assist in starting the thermoelectric power generator. To ensure that the thermoelectric power generator is safely installed, it may include a mounting plate 80 and mounting base 82, which are secured by nuts 84 and bolts 86 to an anchor plate 88 to the floor of the lock box 58. The heat sink 20 may be positioned in almost any position, including vertically, horizontally, or at an incline.

Figure 7:
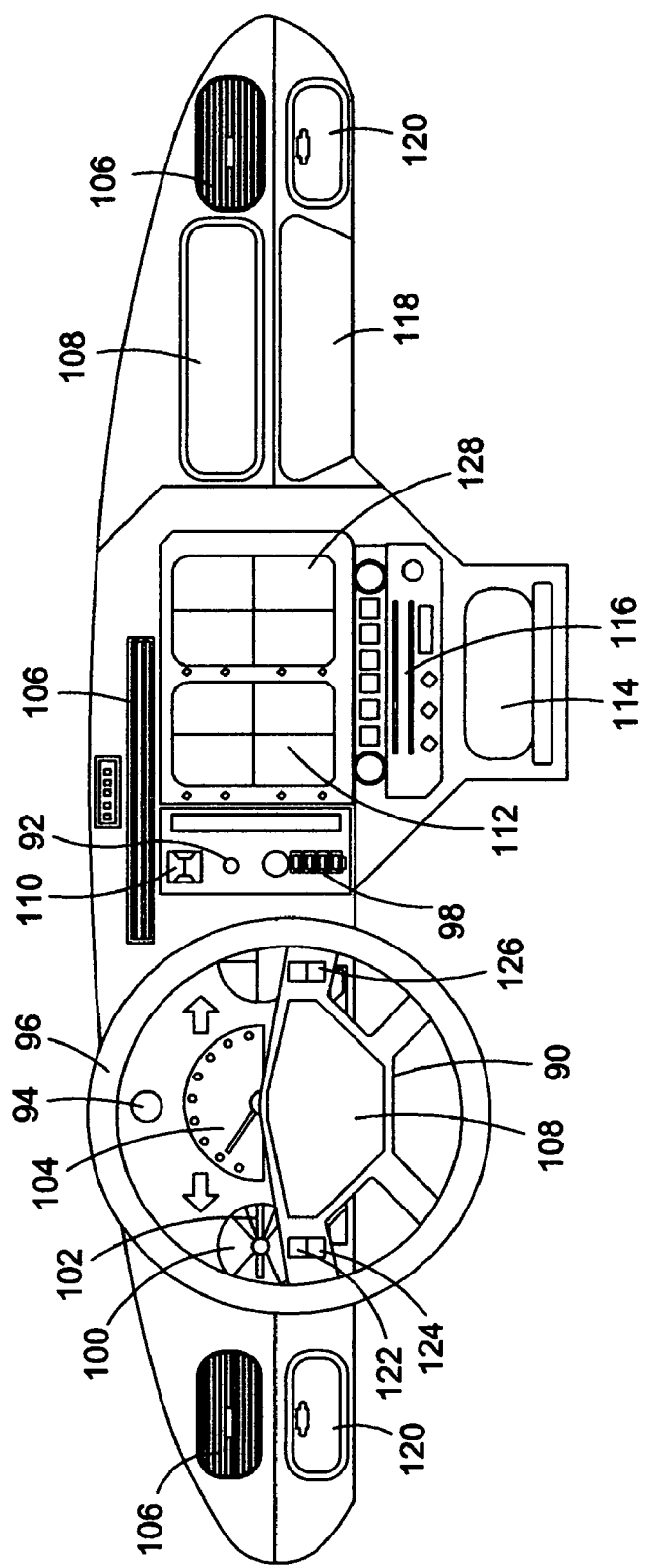
FIG. 7 is a front view of a dash board of one embodiment of the present invention.

FIG. 7 illustrates a dash board control panel of one embodiment of the present invention that is similar to that of present-day electric or combustion engine vehicle dash boards. The dashboard may include an ignition key port 90, starter button 92, on/off power light and meter indicator 94, steering wheel 96, gear box 98, thermoelectric temperature gauge 100, ampere meter 102, speedometer 104, air conditioning/heating vents 106, air bags 108, hazard lights button 110, GPS map/rear camera monitor/TV/DVD monitor 112, storage compartment 114, radio/cassette/CD unit 116, glove compartment 118, coin compartment 120, cruise control on switch 122, cruise control off switch 124, radio remote controls 126, and radiation detector indicators 128.

Figure 8:
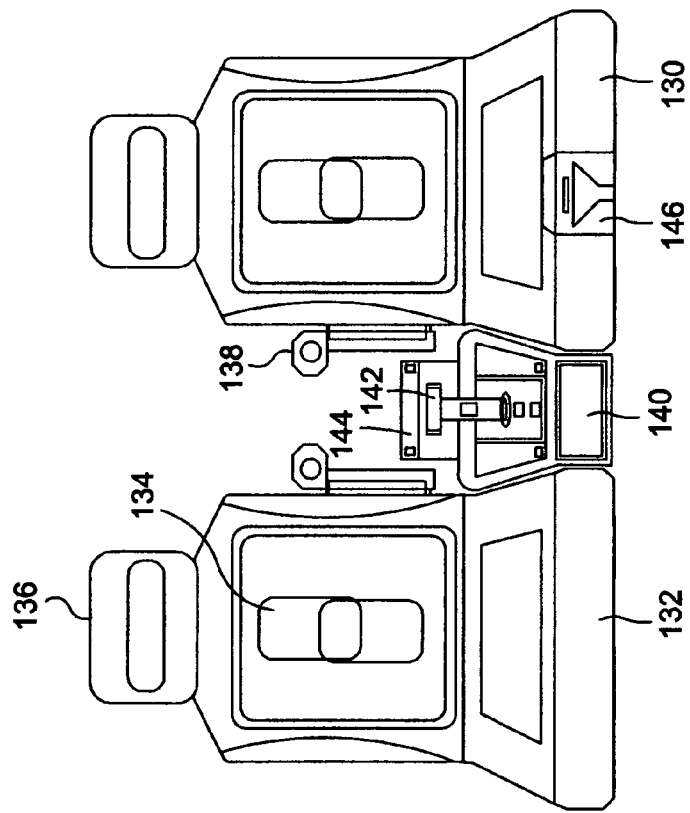
FIG. 8 is a front view of the driver and front passenger seats of one embodiment of the present invention.

FIG. 8 illustrates a front view of a driver seat 130 and front passenger seat 132 of one embodiment of the present invention. The seats may include a lumbar support massage apparatus 134, a headrest 136 with built in speakers, arm rests 138 with built in cup holders, a center console 140, a stick control 142 for amphibious models, and a center console cover 144. Because of the ability of the vehicle to run with no practical distance limitation, certain models may be equipped with a discreet and retractable urine disposal unit 146, which may be particularly useful for operators employed in long distance sales, delivery, first aid, drivers, etc. The disposal unit 146 is attached to a safety glass spout tube (not shown) which is connected to a detachable sanitary container (not shown) located in the back trunk 38 of the vehicle 10. The sealed unit is equipped with self-sanitizing odor/water provision that can easily be pulled out of the vehicle 10, the contents discharged appropriately, washed, and remounted in the vehicle 10.

Figure 9:
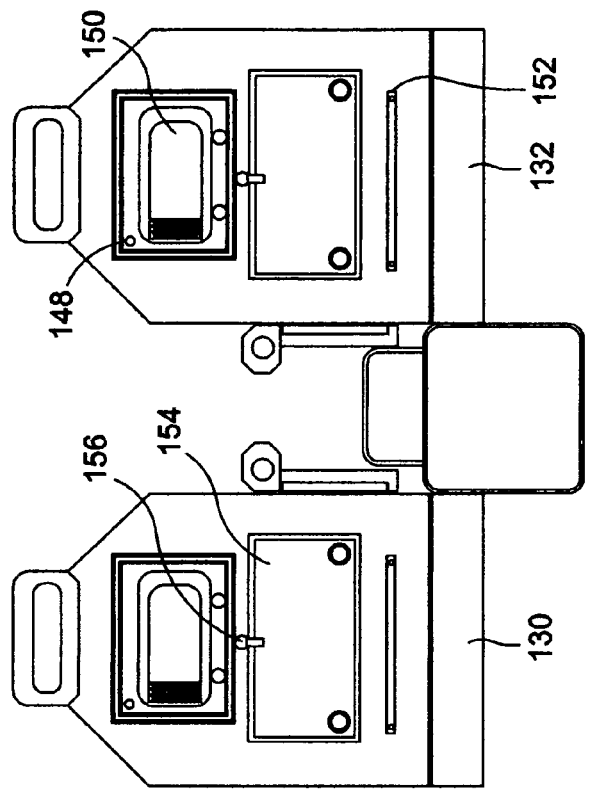
FIG. 9 is a rear view of the driver and front passenger seats of FIG. 8.

FIG. 9 illustrates a rear view of the driver seat 130 and front passenger seat 132, including additional optional features, such as a mini camera 148, screen 150, back seat pocket 152, folding table 154, and table latch 156.

Figure 10:
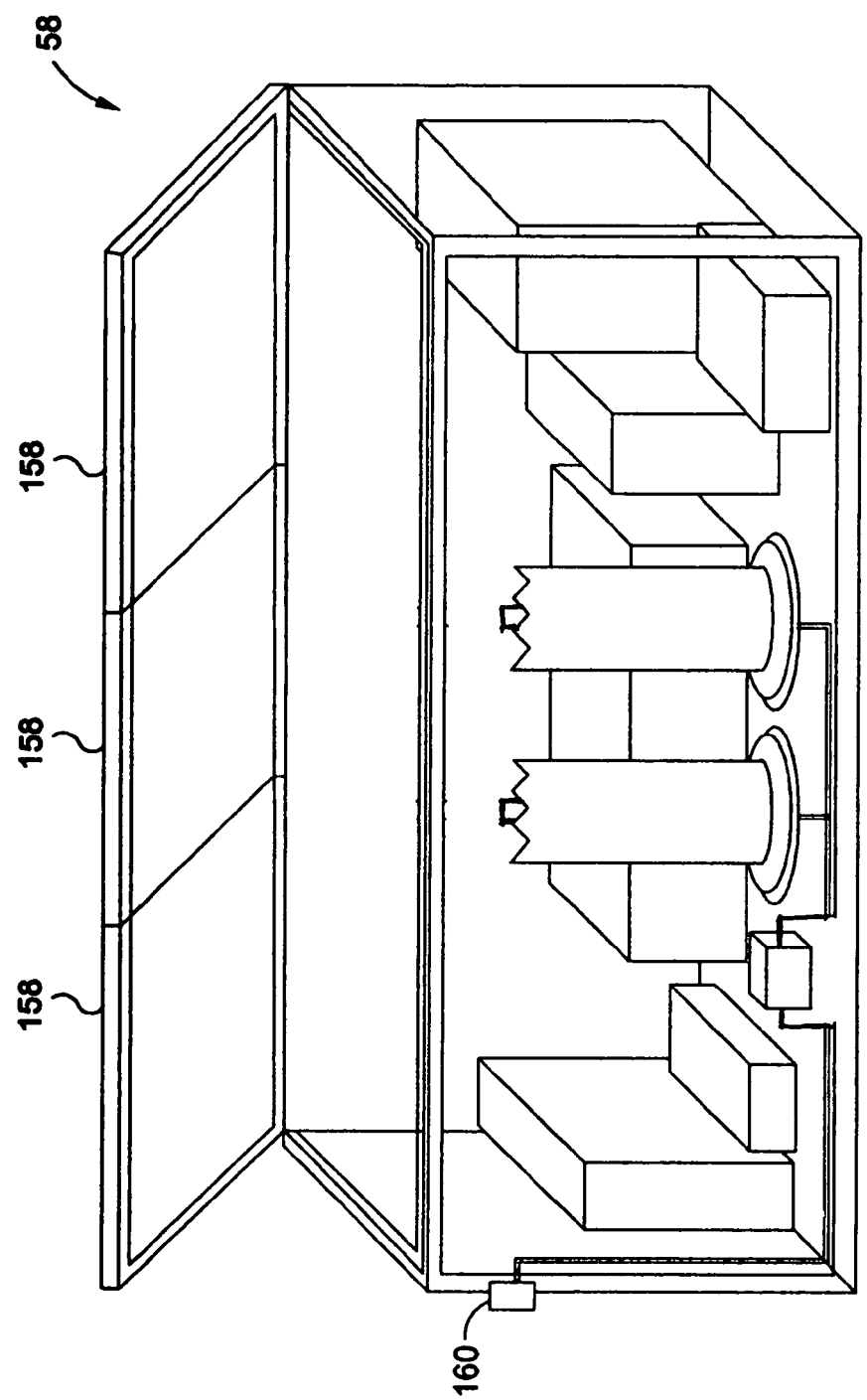
FIG. 10 is a schematic view of a water-proof, climate controlled, portable metal lock box that houses the internal thermoelectric power generators, accessories, and components of one embodiment of the present invention, while FIG. 10-A illustrates the exterior of the lock box of FIG. 10 in a closed, operating configuration.

FIG. 10 illustrates one embodiment of the thermoelectric power generator lock box 58 of the present invention. The lock box 58 may include multiple independently opening lids 158, each optionally having a radiation sensor, a power switch/plug unit 160, and the thermoelectric power generator internal components. The components may be positioned within the lock box 58 in various manners that would best suit the safe, secured, and practical positioning of each component. The lock box 58 may be lined with safety materials, such as lead. The lock box 58 may further include carrying handles (not shown) for removal of the lock box 58 from the vehicle 10. Whereas, FIG. 10-A illustrates the exterior of the lock box 58 equipped with bottom and side mounting units (not shown) and external radiation leak sensors 59.

Figure 11:
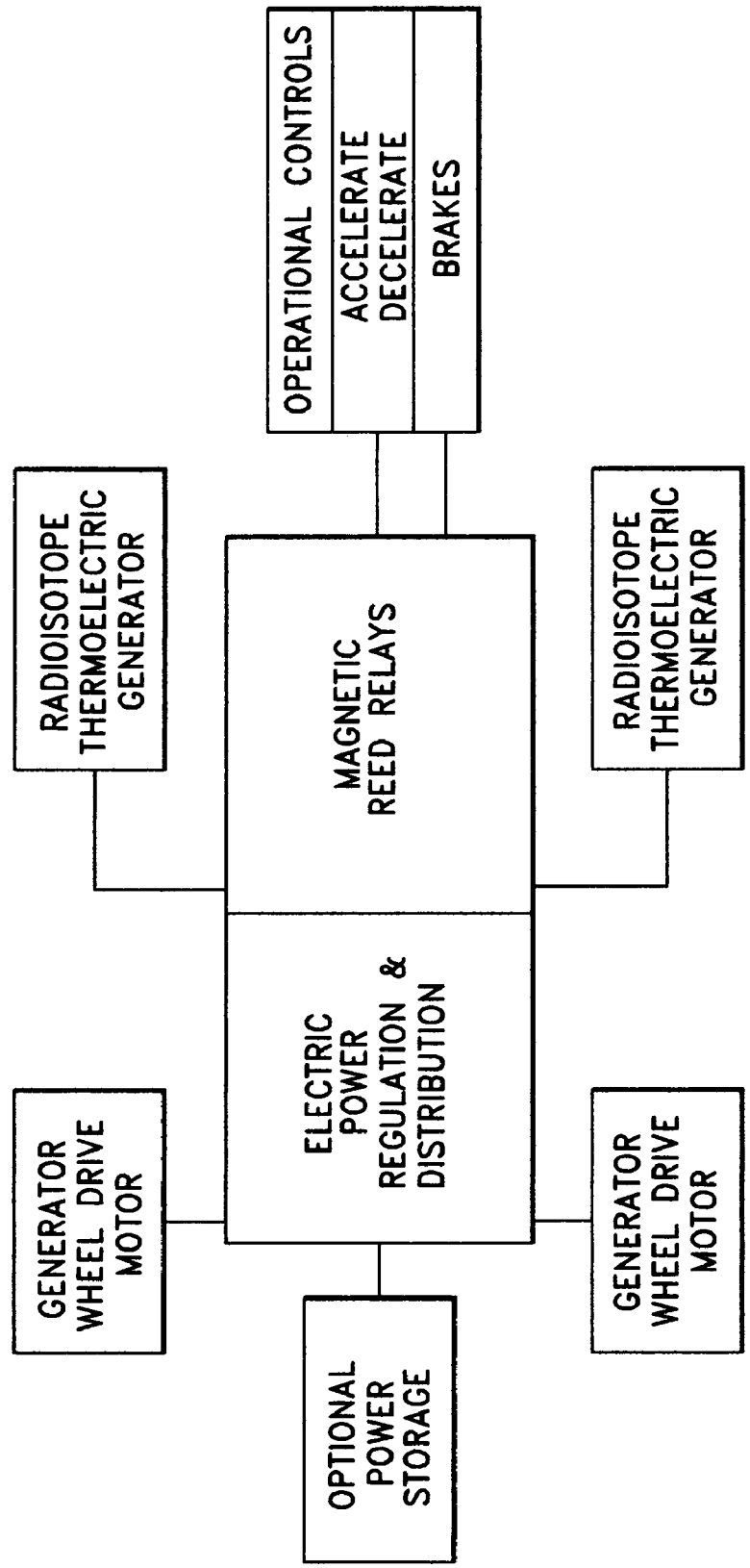
FIG. 11 is a schematic representation of the radioisotope thermoelectric powered vehicle block diagram.
Figure 12:
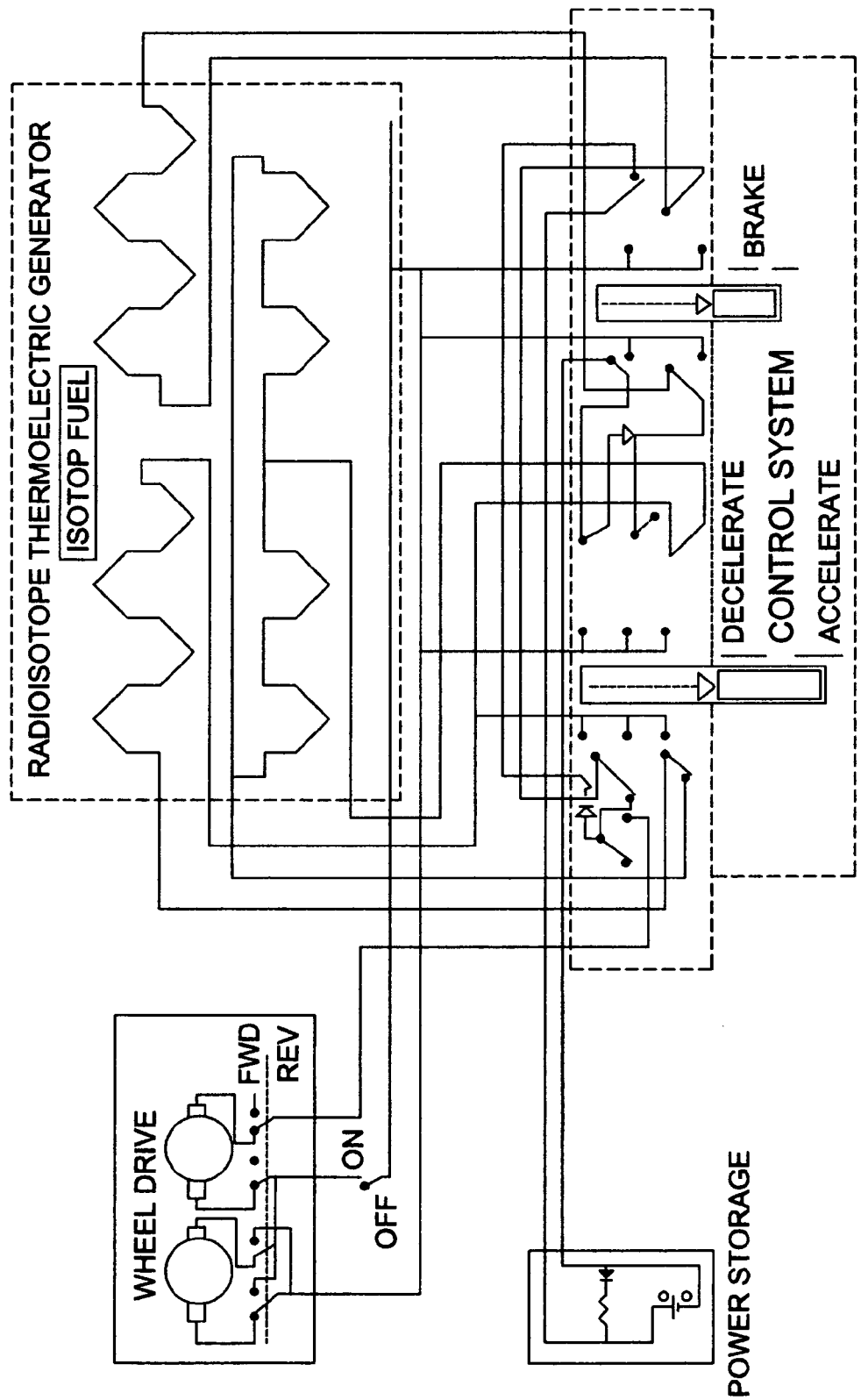
FIG. 12 is a simplified schematic representation of the radioisotope thermoelectric powered vehicle's electrical system.

FIG. 11 is a schematic drawing illustrating a block diagram for an engineless isotope heated thermoelectric vehicle. Whereas, FIG. 12 is a schematic drawing showing a simplified electrical design of an isotope heated thermoelectric power generator.

Figure 13:
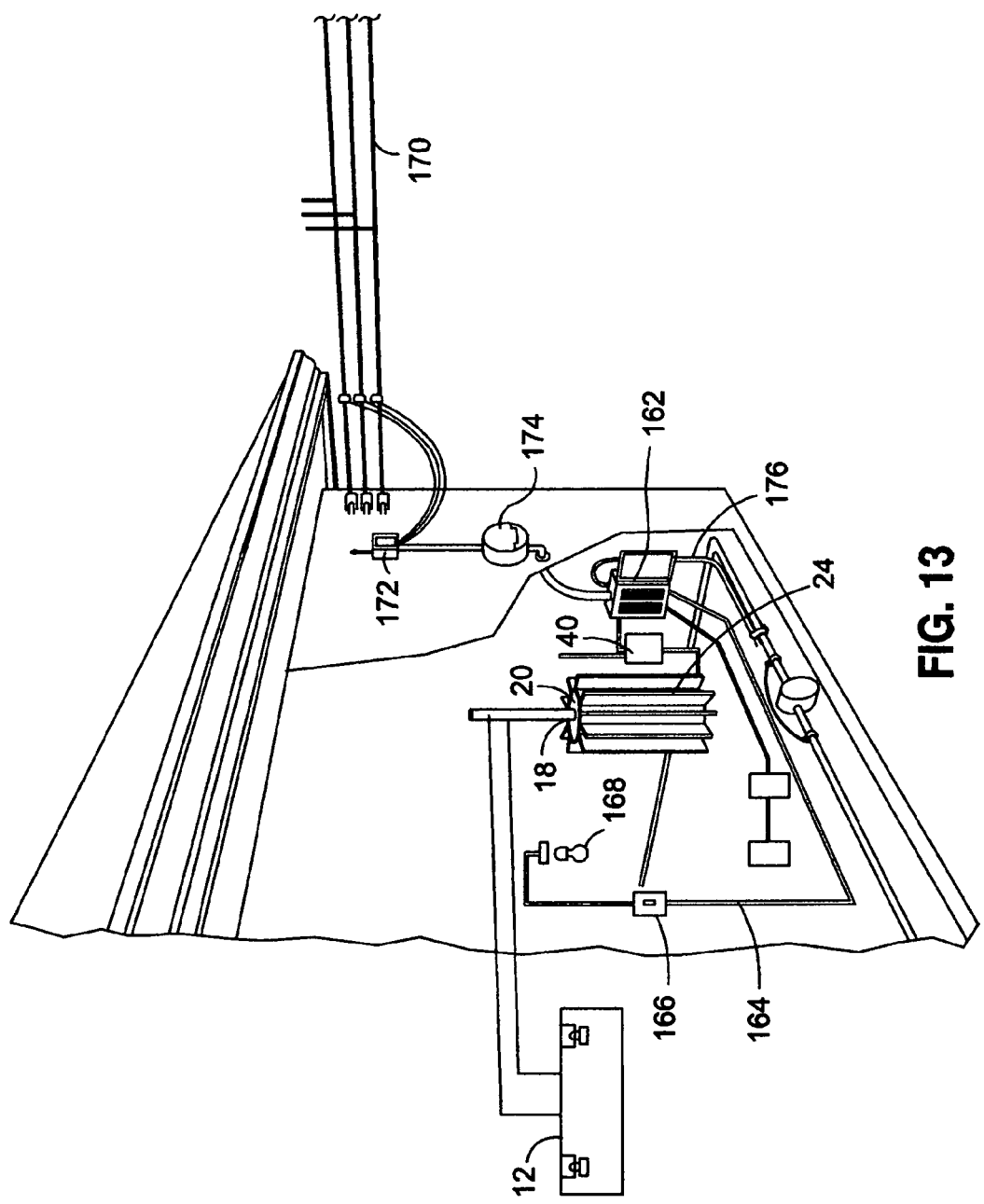
FIG. 13 is a schematic representation of a thermoelectric power generator heated by a radioisotope powering a structure as envisioned by one embodiment of the present invention.

FIG. 13 illustrates another embodiment of the present invention wherein a thermoelectric power generator may be employed to power a structure. An encased isotope element 12 is securely installed in a location within or near the structure. The heat created by the isotope element 12 is then conducted to the metal rod 18 embedded within the heat sink 20 thereby causing the thermoelectric chips 24 to become hot and generate electricity. The electricity is then directed to a power converter 40 and then to a main switch box 162. The electrical current is then directed to the electrical circuits of the structure, exemplified in this figure by a light circuit 164 connected to a light switch 166 which turns on or off a light bulb 168. Prior to engaging the thermoelectric power generator, power originating from the main electrical line 170 should be turned off from the service head panel 172 so that power does not come in through the electric meter 174. Alternatively, electricity from the thermoelectric power generator may be routed to the main electrical line 170 thereby causing the electric meter 174 to run in reverse. As is typical, proper grounding 176 must be included within the circuit. It is envisioned that the vehicle thermoelectric power generator previously discussed may be utilized to power the structure, or a separate standalone thermoelectric power generator may be utilized.

The above description is given by way of example, and not limitation. Given the above disclosure, one skilled in the art could devise variations that are within the scope and spirit of the invention disclosed herein, including various ways of heating, powering, activating, or starting the vehicle, such as by sunlight, isotope elements, metallic rod heated from an external source temporarily touching the metal rod in the heat sink, or batteries. Additionally, different body designs, including amphibious designs, may be utilized so long as the heat source of choice can safely and efficiently be deployed within the body. Also, thermoelectric power generators are not necessarily restricted for use in land, air, or sea conveyance, and may be utilized to power equipment, apparatuses, and any and all things requiring electrical power. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A radioisotope thermoelectric powered vehicle lacking a combustion engine, said vehicle comprising:
   a. an encased isotope element producing heat;
   b. a heating element operative to receive heat from the isotope element, wherein the heating element is embedded within and extends through the length of a heat sink;
   c. a plurality of thermoelectric chips, wherein a hot side of each thermoelectric chip is in contact with an outer surface of the heat sink and wherein the thermoelectric chips are operative to produce electricity upon being heated;
   d. a hollow body surrounding the heat sink;
   e. a hollow space between the thermoelectric chips and the hollow body;
   f. a power converter in electrical contact with the thermoelectric chips; and
   g. at least one DC motor mounted to a wheel of the vehicle, wherein the DC motor is operative to receive electricity from the power converter and to rotate the wheel upon receiving said electricity.

2. The radioisotope thermoelectric powered vehicle of claim 1, further comprising:
   h. a system for managing and controlling the output of electricity from the power converter.

3. The radioisotope thermoelectric powered vehicle of claim 1, further comprising a heat conductor in thermal contact with both the isotope element and the heating element.

4. The radioisotope thermoelectric powered vehicle of claim 3, further comprising a heat conductor regulator positioned between the isotope element and the heating element.

5. The radioisotope thermoelectric powered vehicle of claim 4, wherein the heat conductor regulator is operative to allow or deny the flow of heat from the isotope element to the heating element.

6. The radioisotope thermoelectric powered vehicle of claim 1, wherein the heating element is a metal rod.

7. The radioisotope thermoelectric powered vehicle of claim 6, wherein the metal rod spans the vertical length of the heat sink and extends beyond the body of the heat sink at both ends.

8. The radioisotope thermoelectric powered vehicle of claim 7, wherein the metal rod further contains horizontal branching portions embedded within the heat sink.

9. The radioisotope thermoelectric powered vehicle of claim 1, wherein the heat sink is composed from a material selected from the group consisting of carbon, plastic, metal, stone, glass, or composite materials.

10. The radioisotope thermoelectric powered vehicle of claim 9, wherein the heat sink is composed of carbon graphite.

11. The radioisotope thermoelectric powered vehicle of claim 1, wherein the thermoelectric chips are connected in series.

12. The radioisotope thermoelectric powered vehicle of claim 1, wherein the hollow body is composed from a material selected from the group consisting of metal, carbon, acrylic, plastic, cement, wood, glass, stone, clay, or composite materials.

13. The radioisotope thermoelectric powered vehicle of claim 1, wherein the hollow body further includes cooling fins.

14. The radioisotope thermoelectric powered vehicle of claim 1, wherein the hollow body further includes heat outlets.

15. The radioisotope thermoelectric powered vehicle of claim 14, further comprising a heat storage unit in thermal contact with the heat outlets.

16. The radioisotope thermoelectric powered vehicle of claim 1, wherein the power converter is operative to convert the direct current produced from the thermoelectric chips to alternating current.

17. The radioisotope thermoelectric powered vehicle of claim 1, wherein a DC motor is mounted to each wheel of the vehicle.

18. The radioisotope thermoelectric powered vehicle of claim 1, wherein the heating element, heat sink, thermoelectric chips, hollow body, and power converter are contained within a lockbox mounted within the vehicle, wherein the lockbox is lined with lead.

19. The radioisotope thermoelectric powered vehicle of claim 18, wherein the lockbox is removable from the vehicle.

20. The radioisotope thermoelectric powered vehicle of claim 19, wherein the lockbox may be attached to a structure thereby providing electricity to the structure.

\* \* \* \* \*